US007751354B2

(12) United States Patent
Tuijn et al.

(10) Patent No.: US 7,751,354 B2
(45) Date of Patent: Jul. 6, 2010

(54) METHODS OF NETWORK-INITIATED PARTIAL SESSION TRANSFER

(75) Inventors: Jasper Aartse Tuijn, Enschede (NL);
Dennis J. A. Bijwaard, Enschede (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 519 days.

(21) Appl. No.: 11/550,112

(22) Filed: Oct. 17, 2006

(65) Prior Publication Data

US 2008/0089307 A1 Apr. 17, 2008

(51) Int. Cl.
*H04W 4/00* (2009.01)
(52) U.S. Cl. .................. 370/310; 370/328; 370/338; 455/414.1; 348/14.01
(58) Field of Classification Search ........... 370/342, 370/261, 310, 328, 338; 455/422.1, 445, 455/414.1, 414.3; 348/14.01–14.03
See application file for complete search history.

(56) References Cited

U.S. PATENT DOCUMENTS

2004/0125756 A1* 7/2004 Lepore et al. .............. 370/261

OTHER PUBLICATIONS

ENME: an Enriched Media Application Utilizing Context for Session Mobility; Technical and Human Issues, EUC Workshops, 2005, pp. 316-325 http://www.springerlink.com/content/f574v3575w333j26/fulltext.pdf.*
International Search Report and Written Opinion mailed Mar. 18, 2008.
Mineno et al., "*SIP-Based Streaming Control Architecture for Mobile Personal Area Networks*", Knowledge-Based Intelligent Information and Engineering Systems Lecture Notes in Computer Science; Lecture Notes in Artificial Intelligence; LNCS, Springer Berlin Heidelbeg, BE, vol. 4253, Oct. 10, 2006, pp. 166-173, XP019046292.
Hui Lee, "*Context Awareness: a Practicioner's Perspective*" Ubiquitous Data Management, 2005, UDM 2005; International Workshop on Tokyo, Japan 04-04 Apr. 2005, Piscataway, NJ, USA, IEEE, Apr. 4, 2005, pp. 53-52, XP010843657.
Shacham et al., "*Session Initiation Protocol (SIP) Session Mobility* draft-shacham-sipping-session-mobility-02.txt", IETF Standard-Working-Draft, Internet Engineering Task Force, IETF, CH, No. 2, Feb. 2006, XP015044574.
Student: Chen-Jui Peng Advisor: Ren-Huang Hwang: "*SSIP: Split a SIP Session over Multiple Devices*"; Internet Citation [Online] Jun. 2005, pp. 1-45, XP007904234.
Aartse Tuijn University of Twente D. Bijwaard Alcatel-Lucent J: "*A method for network initiated partial session transfers; draft-aartsetuijn-nipst-00.txt*" IETF Standard-Working Draft, Internet Engineering Task Force, IETF, CH, Feb. 26, 2007, pp. 1-22, XP015048738.

* cited by examiner

*Primary Examiner*—Kamran Afshar
*Assistant Examiner*—Marisol Fahnert
(74) *Attorney, Agent, or Firm*—Williams, Morgan & Amerson, PC

(57) ABSTRACT

The present invention provides a method involving a corresponding node and a mobile node having a first session for multimedia communication. The first session includes a plurality of streams having a corresponding plurality of endpoints. The method includes providing, from a network entity, a first message to the corresponding node requesting transfer of at least one of the plurality of stream endpoints to at least one third node. The method also includes providing, from the network entity, at least one second message inviting the at least one third node to accept transfer of the at least one of the plurality of stream endpoints from the mobile node. The method further includes providing, from the network entity, a third message inviting the mobile node to modify the first session to transfer the at least one of the plurality of stream endpoints to the at least one third node.

16 Claims, 7 Drawing Sheets

METHODS OF NETWORK-INITIATED PARTIAL SESSION TRANSFER

BACKGROUND OF THE INVENTION

1. Field of the Invention

This invention relates generally to communication systems, and, more particularly, to wireless communication systems.

2. Description of the Related Art

Modern communication systems are a tightly integrated mixture of networks that may provide connectivity over wired and/or wireless interfaces. For example, the Internet Protocol (IP) may be used to allow endpoint devices to communicate over heterogeneous networks. The endpoints may include mobile devices, such as cellular telephones, personal data assistants, smart phones, paging devices, text messaging devices, network interface cards, laptop computers, and the like. The endpoints may also include stationary devices such as desktop computers, televisions, videoconferencing devices, hardware IP phones, embedded devices, software phones and the like. The capabilities of the networks and the endpoint devices have evolved, and are expected to continue to evolve, to support more sophisticated types of communication. For example, current and future networks and endpoint devices may be used for IP-based multimedia streaming applications like Video on Demand (VoD) and real-time applications like interactive video games, video-conferencing, and video surveillance.

Mobile devices and stationary endpoints have complementary strengths and weaknesses. Mobile devices typically provide the convenience of mobility but have limited capability compared to stationary devices; e.g., smaller screens and less computing power than stationary devices. As mobile devices improve and include more enhanced capabilities for IP-based multimedia communications, they may still remain limited (relative to stationary devices) in terms of bandwidth, display size, computational power, and battery life. Stationary IP multimedia endpoints typically provide larger screens (which may have higher resolution, better color response, and the like), network bandwidth, and computing power, but they offer limited mobility. Users of mobile devices and/or stationary endpoints usually respond to these limitations by selecting the type of device that is most appropriate for their current needs and accepting the limitations of this choice. For example, a user that expects to begin a video conference in the office but expects to have to leave the office halfway through the videoconference may select a mobile unit (and the corresponding small display size and poor audio quality) in order to be able to participate in the entire video conference. Alternatively, the user may select a stationary device to provide a larger display size and better audio quality but may not be able to participate in the entire video conference.

The proliferation of IP-based multimedia capable devices and increasingly ubiquitous wireless access has created more opportunities for interaction among devices, both static and mobile. In particular, session mobility allows a user to transfer an ongoing session from one device to another device so that more than one device may be used concurrently or interchangeably during a single session, potentially combining the advantages of both devices. For example, continuity of a mobile device user's multimedia experience may be maintained by transferring the session from the mobile device to another device in some situations, e.g., when the mobile unit's battery is almost discharged or when the user wants to use a target device with a larger display, a higher bandwidth and/or lower cost network. For another example, an existing session may be transferred from a stationary device to a mobile unit when a user leaves home or the office.

FIG. 1 conceptually illustrates one proposed method 100 for transferring the stream endpoints of a session to another device. In the illustrated embodiment, a Mobile Node (MN) initially has a session with a Corresponding Node (CN) that is established according to the Session Initiation Protocol (SIP). The MN initiates the session transfer by sending an INVITE message (as indicated by the arrow 105) to an Audio Node (AN) requesting that a new session be established. The INVITE message includes Session Description Protocol (SDP) parameters of the CN that are currently being used in the session. After receiving the INVITE message, the AN may begin transmitting media, e.g. according to a Real-time Transport Protocol (RTP) protocol, to the CN, as indicated by the arrow 110. The AN may also send a message including various operating parameters to the MN, as indicated by the arrow 115. For example, the AN response (at 115) may contain an SDP body that includes the address and ports it will use for any media.

The MN may then send an INVITE message, which is sometimes referred to as a re-invitation message, to the CN containing the media parameters for the AN in the SDP body, as indicated by the arrow 120. For example, the re-INVITE message may include the parameters:

v=0
c=IN IP4 av_device.example.com
m=audio 4400 RTP/AVP 0
m=video 5400 RTP/AVP 34

Following the re-invitation of the CN, the CN will redirect its media streams to the address and port given for the AN in message 120, as indicated by the arrow 125. The CN also sends a response (as indicated by the arrow 130) that includes media parameters used by the CN. The parameters sent in message 130 may or may not be the same as the ones used in the existing session. The MN sends an ACK message to the CN, as indicated by the arrow 135, and an ACK message to the AN, as indicated by the arrow 140, which includes these parameters in the body if they have changed. At this point, the MN has established separate SIP session with the CN and the AN, but a media flow has been established between the CN and the AN.

A single communication session may also be split across multiple devices. For example, an audio device may be used to send and receive audio signals, and a video device may be used to send and receive video signals. FIG. 2 conceptually illustrates a conventional method 200 for splitting a session between two devices. In the illustrated embodiment, a Mobile Node (MN) initially has a session with a Corresponding Node (CN) that is established according to the Session Initiation Protocol (SIP). In order to split the session across multiple local devices, e.g. the Audio Node (AN) and the Video Node (VN) shown in FIG. 2, the MN establishes a new session with each local device through a separate INVITE request and responses from the local devices (as indicated by the arrows 205, 210, 215, 220, 225, 230).

The MN then updates the existing session with the CN by forming an SDP body that combines the media parameters received in the responses 215, 230 from the AN and VN, respectively. For example, in order to transfer an audio and video call to two devices, the MN creates an audio session with one device (the AN) and a video session with another device (the VN), and combines the SDP bodies from both to form the body of the message that is transmitted to re-INVITE the CN, as indicated by arrow 235. One example of a combined SDP body is:

v=0
m=audio 48400 RTP/AVP 0
c=IN IP4 audio_dev.example.com
m=video 58400 RTP/AVP 34
c=IN IP4 video_dev.example.com Following the re-invitation of the CN, the CN will redirect its media streams to the addresses and ports given for the AN in message 235, as indicated by the arrows 240, 245. The CN also sends a response (as indicated by the arrow 250) that includes media parameters used by the CN in the message body. The MN sends an ACK message to the CN, as indicated by the arrow 255, and ACK messages to the AN and the VN, as indicated by the arrows 260, 265. At this point, the MN has established separate SIP sessions with the CN, the AN, and the VN, but separate media flows have been established between the CN and the AN and the CN and the VN.

Partial session transfer is a variation of the technique for splitting a communication across multiple devices. A partial session transfer results in the mobile node transmitting and receiving some media streams, but other media streams are directed to and from another local device. For example, a mobile device may transmit and receive video streams, but may transfer a portion of the session to an audio node to handle audio streams. Conventional partial session transfers are initiated by the mobile node, e.g., by transmitting an INVITE message to another local device. However, conventional networks are not capable of initiating partial session transfers.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a corresponding node and a mobile node having a first session for multimedia communication. The first session includes a plurality of streams having a corresponding plurality of endpoints. The method includes providing, from a network entity, a first message to the corresponding node requesting transfer of at least one of the plurality of stream endpoints to at least one third node. The method also includes providing, from the network entity, at least one second message inviting the at least one third node to accept transfer of the at least one of the plurality of stream endpoints from the mobile node. The method further includes providing, from the network entity, a third message inviting the mobile node to modify the first session to transfer the at least one of the plurality of stream endpoints to the at least one third node.

In another embodiment of the present invention, a method is provided involving a corresponding node and a mobile node having a first session for multimedia communication. The first session includes a plurality of streams having a corresponding plurality of endpoints. One embodiment of the method includes receiving, from a network entity, a first message requesting transfer of at least one of the plurality of stream endpoints to at least one third node and providing, to the network entity, a second message indicating whether the requested transfer is accepted. The method also includes receiving, from the network entity, a third message requesting modification of the first session to transfer the at least one of the plurality of stream endpoints to at least one third node.

BRIEF DESCRIPTION OF THE DRAWINGS

The invention may be understood by reference to the following description taken in conjunction with the accompanying drawings, in which like reference numerals identify like elements, and in which.

Figure 1:
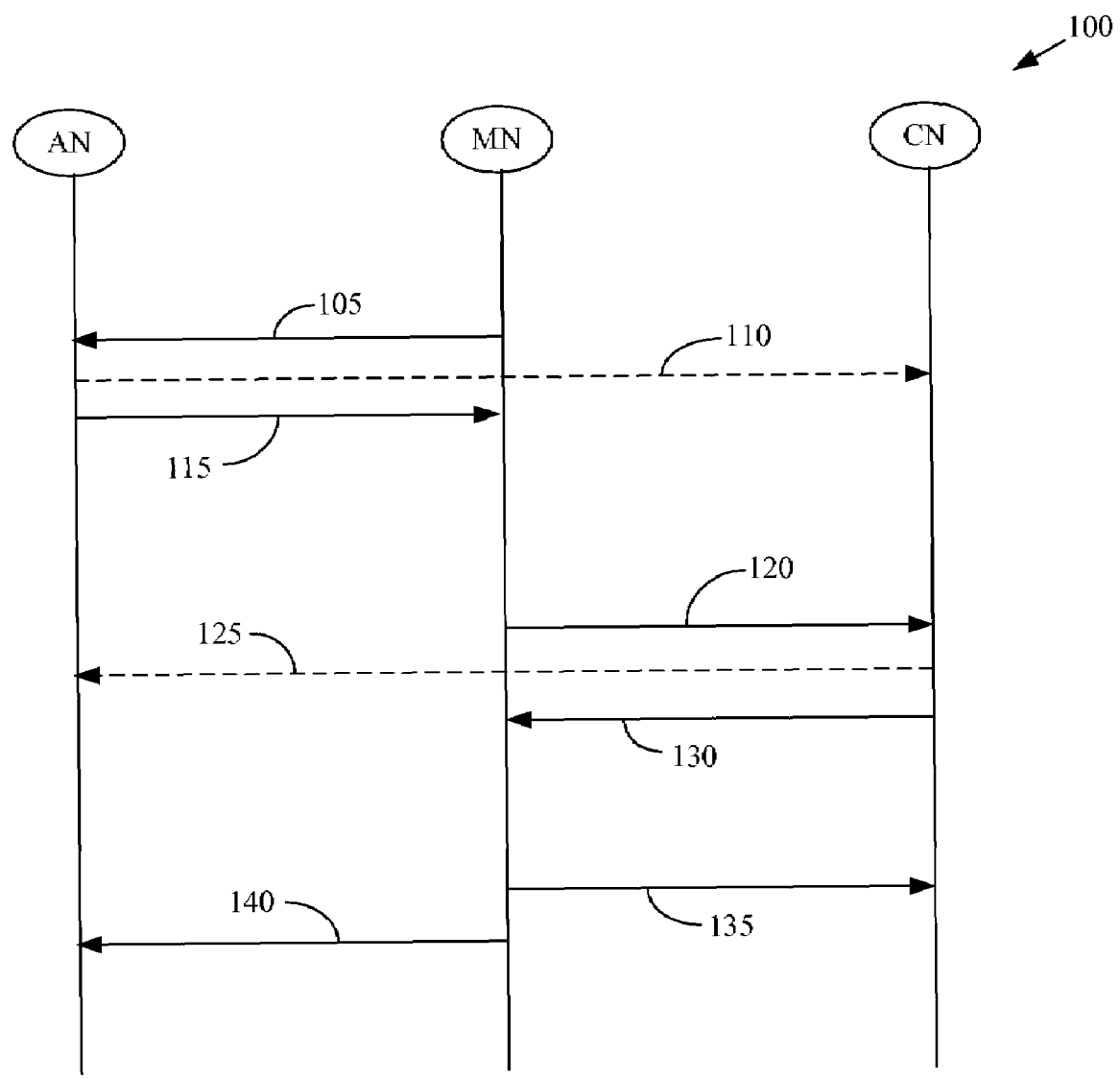
FIG. 1 conceptually illustrates a proposed method for transferring the stream endpoints of a session to another device.
Figure 2:
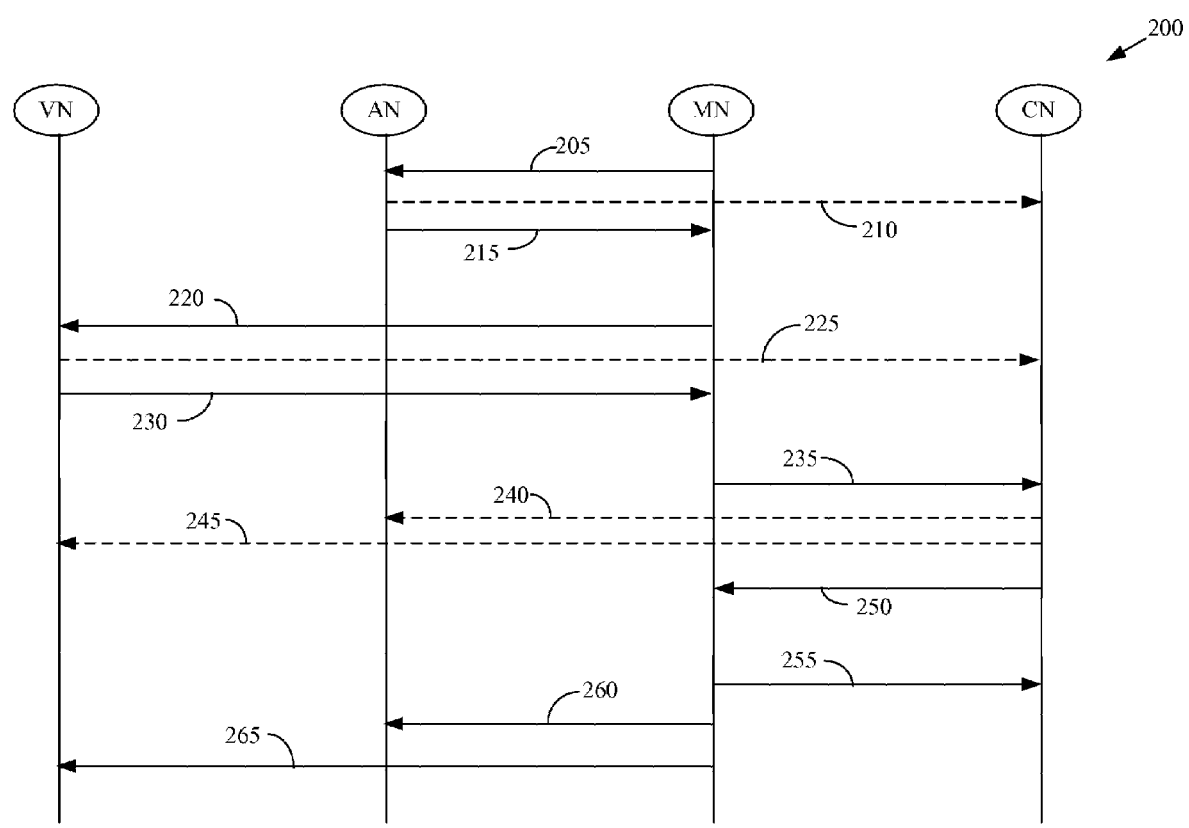
FIG. 2 conceptually illustrates a proposed method for splitting a session between two devices.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, wireless (or air) interface, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 3:
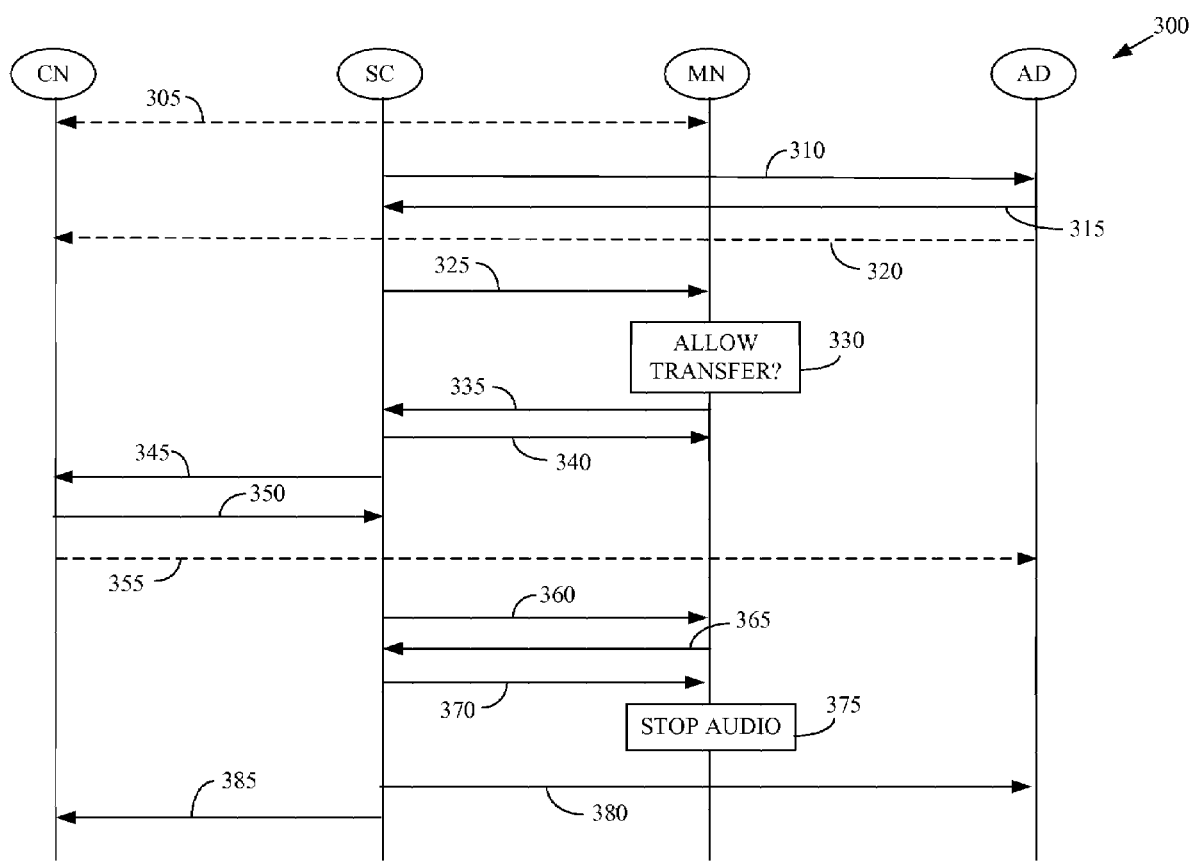
FIG. 3 conceptually illustrates a first exemplary embodiment of a network-initiated partial session transfer method, in accordance with the present invention.

FIG. 3 conceptually illustrates a first exemplary embodiment of a network-initiated partial session transfer method 300. In the illustrated embodiment, a mobile node (MN) and a corresponding node (CN) have an existing communication session (as indicated by the arrow 305). The term "session" is defined herein in accordance with common usage in the art as a set of senders and receivers and the data stream(s) flowing from senders to receivers, or, logically the linked sending/receiving of one or more data/control streams between the sender and receiver. A multimedia conference is an example of a session. In various alternative embodiments, the mobile node and the corresponding node may be implemented in any desirable device. The term "device" is defined herein in accordance with common usage in the art as a software or hardware appliance, which may represented by a session initiation protocol (SIP) user agent (UA). The mobile node and/or the corresponding node, or applications within the mobile node and the corresponding node, may therefore act as senders and/or receivers in the existing communication session 305.

The mobile node and the corresponding node indicate via a network (not shown) that includes a sub-session controller (SSC). The sub-session controller may be implemented in software, firmware, hardware, or any combination thereof. The sub-session controller may initiate a partial transfer of the communication session 305. As used herein in accordance with common usage in the art, the term "partial session transfer" refers to transferring a portion of a session, such as one or more endpoints of a plurality of data streams that form the session, from one of the devices involved in the session to a different device. The portion of the session may be referred to herein as a sub-session. In the illustrated embodiment, an audio device (AD) is configured to send and/or receive signals in an audio stream. Accordingly, the partial session transfer may be used to transfer a portion of the existing session 305, e.g., one or more audio stream endpoints, from the mobile node to the audio device. However, persons of ordinary skill in the art having benefit of the present disclosure should appreciate that the audio device and corresponding audio stream are exemplary and not intended to limit the present invention. In alternative embodiments, partial session transfers may be used to transfer one or more stream endpoints or portions of the session 305 to any device or combination of devices.

In the first exemplary embodiment, the sub-session controller initiates the partial session transfer by sending a message (as indicated by the arrow 310) inviting the audio device to form a sub-session with the mobile node containing stream endpoints of the corresponding node. The stream endpoints may be media sources and/or receivers. The sub-session may be used to support an audio stream between the corresponding node and the audio device, however, at this point the sub-session is not necessarily related to or a part of the session 305. The audio device responds by transmitting (as indicated by the arrow 315) a response message that indicates that the audio device either accepts or declines the invitation to form the sub-session with the mobile node. If the audio device accepts the invitation to form the sub-session, then the corresponding media-stream between the audio device and the corresponding node may be formed, as indicated by the arrow 320. Techniques for forming sessions and/or sub-sessions and/or media-streams between nodes are known in the art and in the interest of clarity only those aspects of forming sessions and/or sub-sessions and/or media streams that are relevant to the present invention will be described further herein.

The sub-session controller sends (as indicated by the arrow 325) a message to the mobile node inviting the mobile node to modify the session 305 by allowing partial session transfers to the audio device. For example, if the network operates according to the SIP, the sub-session controller sends (at 325) a re-INVITE message with the required method 'pst-control' to the mobile node to propose using the audio device for audio instead of using the mobile node. The 'pst-control' method is an extension to SIP and it may be indicated by the method 'pst-control' in the 'required' header of the re-INVITE message. If a SIP UA does not understand this extension, it responds with a 'bad extension' response according to SIP. Headers and/or tags, such as defined by SIP, may be included in the re-INVITE to allow the mobile node to control the sub-session. Exemplary headers and/or tags may include a 'pst-to' header including information that indicates a destination address of the audio device, a 'pst-from' header that includes information that indicates the source address of the mobile node, and a 'pst-call-id' identifier for the partial session transfer.

The re-INVITE message may also contain an SDP body that describes the exact changes in the session. For example, the SDP body sent to the CN by the MN for the initial session 305 may include:

v=0
c=IN IP4 mn.example.com
m=audio 48400 RTP/AVP 0
m=video 58400 RTP/AVP 34 and the SDP body in the re-INVITE message (at 325) may include:

v=0
m=audio 48400 RTP/AVP 0
c=IP4 audio-dev.example.com
m=video 58400 RTP/AVP 34
c=IN IP4 mn.example.com The mobile node can compare these two SDP bodies and thereby determine that the audio-stream may be transferred to the audio device (audio-dev.example.com) using the same codec, etc., while the video stream may continue on the same device (i.e., the mobile node). However, persons of ordinary skill in the art should appreciate that the codec need not be the same in all embodiments.

The mobile node determines (at 330) whether to accept or allow the invited partial session transfer. The determination (at 330) may be based on the information provided (at 325) in the invitation message, as well as any other information available to the mobile node. The node may respond by sending an OK message to the sub-session controller if it supports the extension and it wants the partial session transfer to continue. If the mobile node does not support the extension, it responds with a 420 (Bad extension) according to SIP. The sub-session controller can then decide if it still wants the partial session transfer to continue (e.g. from user-profile), as will be discussed further below. The sub-session controller should in this case close sub-sessions when MN closes the session. If the MN does support the extension and it does not want the partial session transfer to continue, it responds with a 603 (decline) message, as will be discussed further below. In the illustrated embodiment, the mobile node decides to accept the invited partial session transfer and therefore provides a response indicating acceptance of the proposed partial session transfer to the sub-session controller, as indicated by the arrow 335. The sub-session controller receives the response and provides (as indicated by the arrow 340) an acknowledgement message confirming receipt of the response and initiation of the partial session transfer.

Once the mobile node has accepted the partial session transfer, the sub-session controller provides (as indicated by the arrow 345) a message requesting that the corresponding node transfers a portion of the session 305 to the audio device. For example, the sub-session controller may send a re-INVITE message to the corresponding node to notify the corresponding node of the changed SDP (e.g., the SDP will indicate that the IP address of the audio device should be used instead of the IP address of the mobile node for the audio stream). A video stream (or any other streams) may still be going to the mobile node. The corresponding node may then transmit (as indicated by the arrow 350) a message indicating that it has accepted the request to transfer the portion of the session 305 to the audio device. The corresponding node may then form an audio stream with the audio device, as indicated by the arrow 355.

The sub-session controller provides (as indicated by the arrow 360) a message, such as a re-INVITE message, to the mobile node requesting that the mobile node stops transmitting audio over the audio stream between the mobile mode and the corresponding node. The mobile node provides (as indicated by the arrow 365) a message confirming the request to stop transmitting audio using the audio stream between the mobile node and the corresponding node. The sub-session controller may provide (as indicated by the arrow 370) an acknowledgment confirming receipt of the previous message 365 from the mobile node. The mobile node may then stop (at 375) transmitting audio using the audio stream between the mobile node and the corresponding node at substantially any time after receiving the message 360 requesting that the mobile node stop transmission. A sub-session controller may also provide acknowledgments to the audio device and the corresponding node confirming completion of the partial session transfer, as indicated by the arrows 380, 385.

Figure 4:
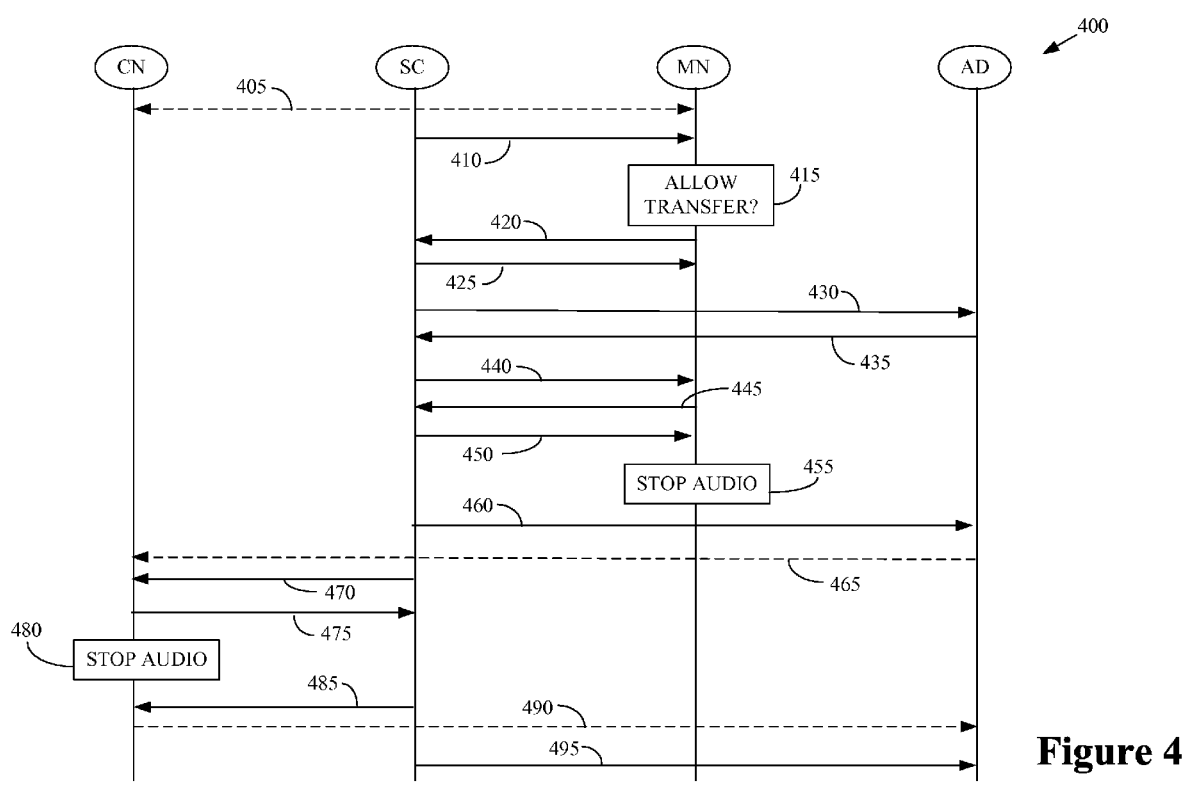
FIG. 4 conceptually illustrates a second exemplary embodiment of a network-initiated partial session transfer method, in accordance with the present invention.

FIG. 4 conceptually illustrates a second exemplary embodiment of a network-initiated partial session transfer method 400. In the illustrated embodiment, a mobile node (MN) and a corresponding node (CN) have an existing communication session (as indicated by the arrow 405). As in the first exemplary embodiment, the sub-session controller initiates a partial session transfer. However, in the second exemplary embodiment, the sub-session controller initiates the partial session transfer by sending a message (as indicated by the arrow 410) to the mobile node inviting the mobile node to modify the session 405 by allowing a partial session transfer to the audio device. As discussed herein, if the network operates according to the SIP, the sub-session controller may send (at 410) a re-INVITE message with the method 'pst-control,' as well as headers and/or tags that may include a 'pst-to' header, and a 'pst-call-id' identifier. The re-INVITE message may also contain an SDP body that describes the exact changes in the session.

The mobile node determines (at 415) whether to accept or allow the invited partial session transfer. The determination (at 415) may be based on the information provided (at 410) in the invitation message, as well as any other information available to the mobile node. In the illustrated embodiment, the mobile node decides to accept the invited partial session transfer and therefore provides an response indicating acceptance of the proposed partial session transfer to the sub-session controller, as indicated by the arrow 420. The sub-session controller receives the response and provides (as indicated by the arrow 425) an acknowledgement message confirming receipt of the response and initiation of the partial session transfer.

In the second exemplary embodiment, the sub-session controller then sends a message (as indicated by the arrow 430) to the audio device proposing initiation of the partial session transfer and the audio device responds by transmitting (as indicated by the arrow 435) a response message that indicates that the audio device either accepts or declines the invitation to form the sub-session with the MN containing stream endpoint(s) of the CN. The sub-session controller provides (as indicated by the arrow 440) a message, such as a re-INVITE message, to the mobile node requesting that the mobile node stops transmitting audio over the audio stream between the mobile mode and the corresponding node. The mobile node responds by sending (as indicated by the arrow 445) a message confirming the request to stop transmitting audio using the audio stream between the mobile node and the corresponding node. The sub-session controller may then provide (as indicated by the arrow 450) an acknowledgment confirming receipt of the previous message 445 from the mobile node.

The mobile node may then stop (at 455) transmitting audio using the audio stream between the mobile node and the corresponding node at substantially any time after receiving the message 440 requesting that the mobile node stop transmission.

The sub-session controller may provide an acknowledgment to the audio device confirming the response it sent (at 435), as indicated by the arrow 460. In response to the acknowledgement 460, the sub-session between the audio device and mobile node may be formed and the audio device may begin providing an audio stream to the corresponding node, as indicated by the arrow 440. The sub-session controller also provides (as indicated by the arrow 470) a message, such as a re-INVITE message, requesting that the corresponding node transfers a portion of the session 405 to the audio device. The corresponding node may then transmit (as indicated by the arrow 475) a message indicating that it has accepted the request to transfer the portion of the session 405 to the audio device and may stop (at 480) transmitting an audio stream to the mobile node. The mobile node may provide (at 485) an acknowledgement of the acceptance 475 and the corresponding node may then form an audio stream with the audio device, as indicated by the arrow 490. Video streams (or any other streams) may still exist between the mobile node and CN. The sub-session controller then provides (as indicated by the arrow 495) a message to the audio device confirming completion of the partial session transfer.

Figure 5:
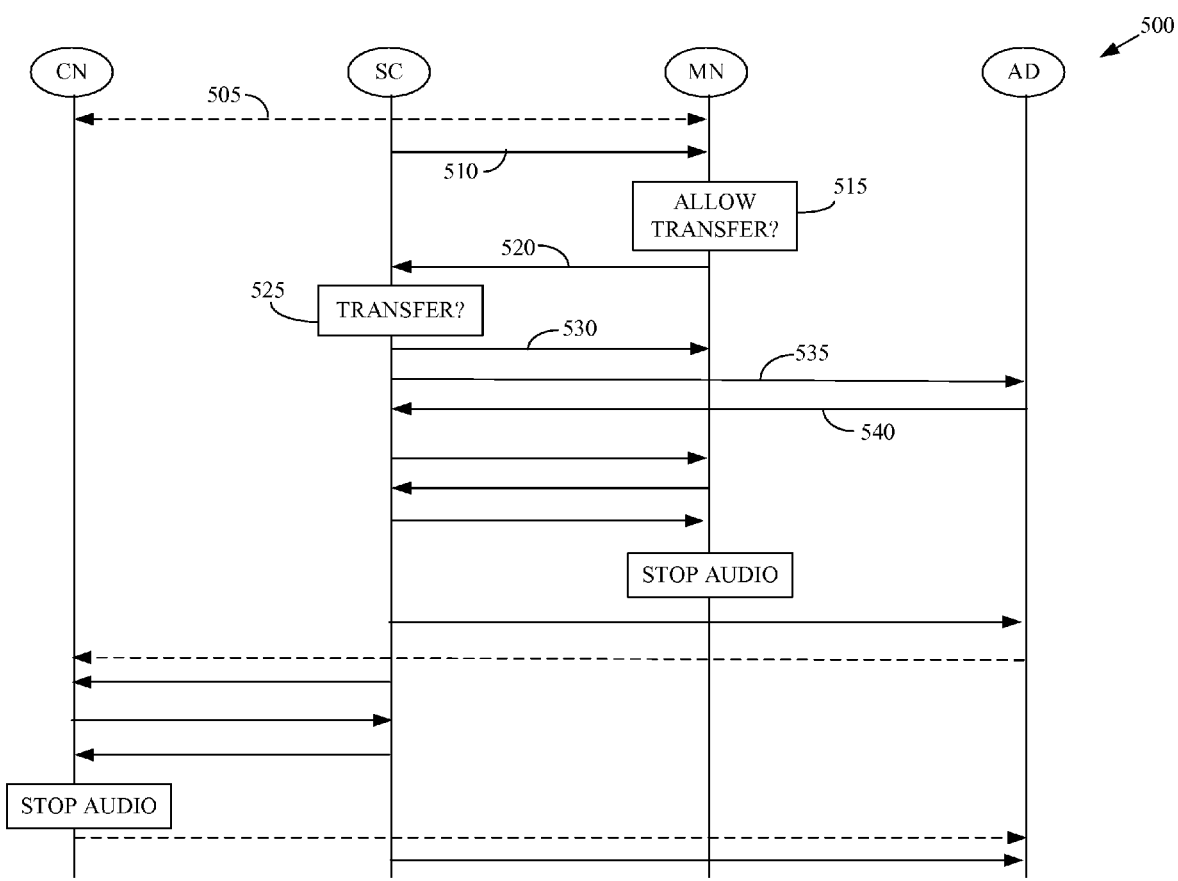
FIG. 5 conceptually illustrates a third exemplary embodiment of a network-initiated partial session transfer method, in accordance with the present invention.

FIG. 5 conceptually illustrates a third exemplary embodiment of a network-initiated partial session transfer method 500. In the illustrated embodiment, a mobile node (MN) and a corresponding node (CN) have an existing communication session (as indicated by the arrow 505). As in the second exemplary embodiment, the sub-session controller initiates the partial session transfer by sending a message (as indicated by the arrow 510) to the mobile node inviting the mobile node to modify the session 505 by allowing a partial session transfer to the audio device. The mobile node determines (at 515) whether to accept or allow the invited partial session transfer. However, in the third exemplary embodiment, the mobile node decides not to accept the invited partial session transfer and therefore provides an response indicating that the proposed partial session transfer to the audio device has been declined, as indicated by the arrow 520. For example, the mobile node may not support the required extensions and/or methods and may therefore return a negative response, such as a "Bad Extension" message.

In the third exemplary embodiment, the sub-session controller receives the negative response and determines (at 525) whether to proceed with the proposed partial session transfer. Even though the mobile node does not support the extensions indicated in the header or has sent a negative response to the request for the partial session transfer, the mobile node may still be capable of functioning if part of the session 505 is transferred to another device, such as the audio device. The sub-session controller may be able to determine that the partial session transfer may be completed using information supplied by the mobile node or the user. For example, the sub-session controller may access user preferences and/or a user profile and use this information to determine (at 525) whether to proceed with the proposed partial session transfer. In the illustrated embodiment, the sub-session controller determines (at 525) to proceed with the partial session transfer and therefore provides (as indicated by the arrow 530) a message confirming receipt of the negative response.

The sub-session controller then proceeds with initiation of the partial session transfer. In the third exemplary embodiment, the sub-session controller sends a message (as indicated by the arrow 535) to the audio device proposing the setup of a session with the mobile node. For example, the SDP body of this INVITE message may contain a media description of type audio and the ip-address may be that of the correspondent node. In this example, the session is being set-up between the MN (e.g., the SSC sends the invite on behalf of the MN) and the AD, while the media-stream flows between the CN and AD. The audio device responds by transmitting (as indicated by the arrow 540) a response message that indicates that the audio device either accepts or declines the invitation to form the sub-session with the mobile node. If the audio device accepts the invitation to form the sub-session with a mobile node containing the IP address of the CN as a stream endpoint, then the method 500 proceeds as indicated in the second exemplary embodiment depicted in FIG. 4. Accordingly, the arrows and boxes shown in FIG. 5 following the arrow 540 substantially correspond to the same arrows and boxes shown in the same portion of FIG. 4. In one embodiment, the CN is multihomed (and/or supports partial session mobility) and therefore can have multiple IP addresses, one of which can be selected by the CN as an endpoint for each stream.

Figure 6:
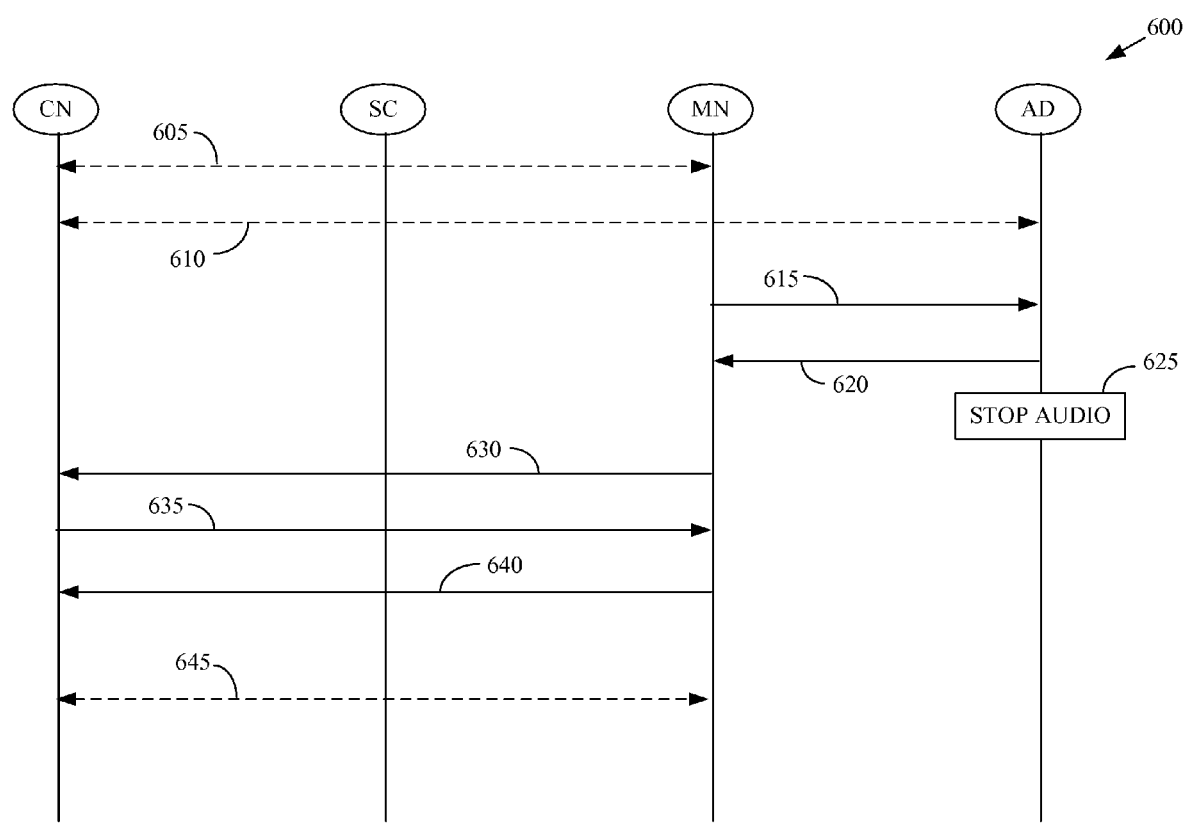
FIG. 6 conceptually illustrates one exemplary embodiment of a method of retrieving a partial session, in accordance with the present invention.

FIG. 6 conceptually illustrates one exemplary embodiment of a method 600 of retrieving a partial session. In the illustrated embodiment, partial session transfer has been used to transfer a portion of a session between the mobile node and the corresponding node to an audio device. Thus, the corresponding node has a first session 605 with the mobile node and the mobile node has a second session 610 with the audio device. The first and second sessions are defined (e.g., using SDP) such that an audio stream flows between the corresponding node and the audio device, while other streams flow between the corresponding node and mobile node. The mobile node then initiates retrieval of the endpoint of the audio stream 610 from the audio device by transmitting (as indicated by the arrow 615) a message indicating that the audio device should discontinue transmitting and/or receiving an audio stream to/from the corresponding node. In one embodiment, the message 615 includes information indicating the second partial session 610, such as a call-session-ID associated with the second partial session 610. In response to the message of 615, the audio device may transmit (at 620) a message acknowledging that the second partial session 610 is being discontinued and may then stop (at 625) transmitting an audio stream to the corresponding node.

The mobile node may provide (as indicated by the arrow 630) a message, such as a re-INVITE message, requesting that the corresponding node transfer the second portion 610 of the session to the mobile node. The corresponding node may then transmit (as indicated by the arrow 635) a message indicating that it has accepted the request to transfer the second portion 610 to the mobile node. The mobile node may provide (at 640) an acknowledgement of the acceptance 630 and the corresponding node may then form an audio stream with the mobile node, as indicated by the arrow 645. Thus, the first and second portions 605, 645 of the communication session may both terminate at the corresponding node and the mobile node.

Figure 7:
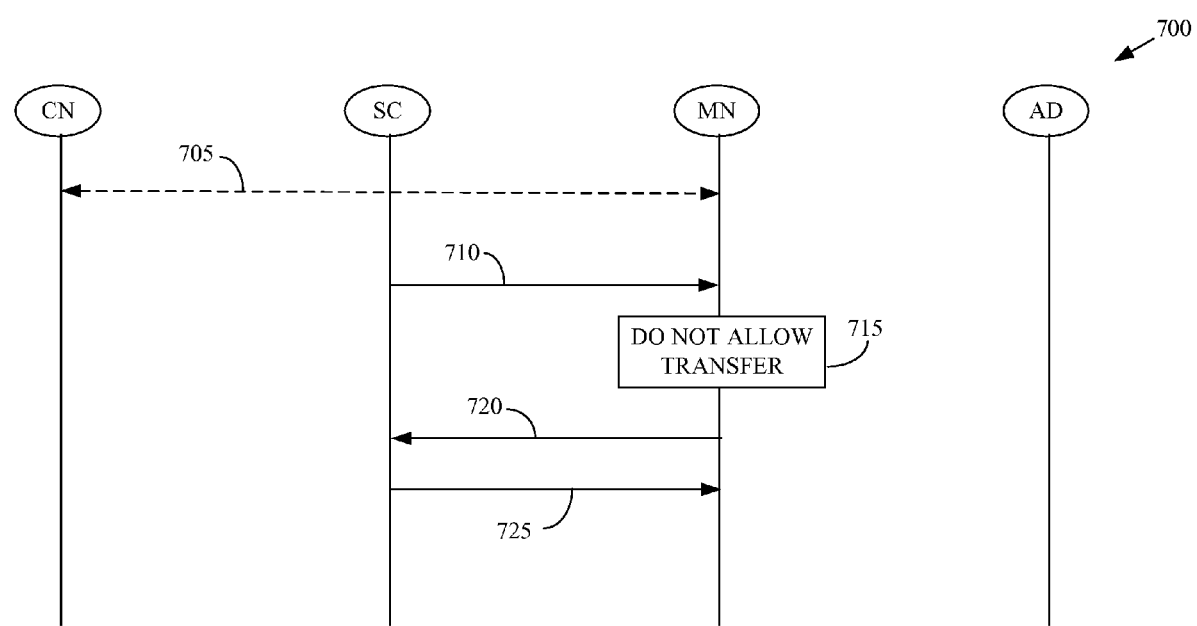
FIG. 7 conceptually illustrates one exemplary embodiment of a method of denying a network-initiated partial session transfer, in accordance with the present invention.

FIG. 7 conceptually illustrates one exemplary embodiment of a method 700 of denying a network-initiated partial session transfer. In the illustrated embodiment, a mobile node (MN) and a corresponding node (CN) have an existing communication session (as indicated by the arrow 705). As in the previous embodiments, the sub-session controller initiates the partial session transfer by sending a message (as indicated by the arrow 710) to the mobile node inviting the mobile node to modify the session 705 by allowing a partial session transfer to the audio device. The mobile node determines (at 715) whether to accept or allow the invited partial session transfer. In the illustrated embodiment, the mobile node decides not to accept the invited partial session transfer and therefore provides a response indicating that the proposed partial session transfer to the audio device has been declined, as indicated by the arrow 720. For example, the mobile node may not support the required extensions and/or methods and may therefore return a negative response, such as a "Bad Extension" message. For another example, user input at the mobile node may indicate that the user does not want to proceed with the proposed partial session transfer. The sub-session controller receives the negative response and determines not to proceed with the partial session transfer in response to the mobile node declining the request for the partial session transfer. The sub-session controller therefore provides (as indicated by the arrow 725) a message confirming receipt of the negative acknowledgment and termination of the proposed partial session transfer.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method involving a corresponding node and a mobile node having a first session for multimedia communication, the first session including a plurality of streams having a corresponding plurality of endpoints, comprising:
    providing, from a network entity, a first message to the corresponding node requesting transfer of a first portion of the plurality of stream endpoints from the mobile node to at least one third node;
    providing, from the network entity, at least one second message inviting said at least one third node to accept transfer of the first portion of the plurality of stream endpoints from the mobile node; and
    providing, from the network entity, a third message inviting the mobile node to modify the first session by transferring the first portion of the plurality of stream endpoints to said at least one third node while a second portion of the plurality of stream endpoints remains attached to the mobile node.

2. The method of claim 1, wherein providing the first message comprises providing at least one of control information, addresses of the corresponding, mobile, and third nodes, an identifier of the first session, and a proposed mapping of the plurality of stream endpoints to the nodes.

3. The method of claim 2, wherein the first portion of the plurality of streams includes at least one audio stream and the second portion of the plurality of streams includes at least one video stream, and wherein providing the first message comprises providing a first message requesting transfer of either the audio stream or the video stream endpoints from the mobile node to the third node.

4. The method of claim 1, comprising receiving a response message from the corresponding node in response to providing the first message.

5. The method of claim 4, wherein receiving the response message comprises receiving the response message in response to user input at the corresponding node.

6. The method of claim 4, wherein providing the second message comprises providing the second message in response to receiving the response message.

7. The method of claim 1, wherein providing the second message comprises providing the second message based on user preferences.

8. The method of claim 1, wherein providing the third message comprises providing a third message indicating the mapping of the plurality of data streams.

9. A method involving a corresponding node and a mobile node having a first session for multimedia communication, the first session including a plurality of streams having a corresponding plurality of endpoints, comprising:
    receiving, from a network entity, a first message requesting transfer of a first portion of the plurality of stream endpoints from the mobile node to at least one third node;
    providing, to the network entity, a second message indicating whether the requested transfer is accepted; and
    receiving, from the network entity, a third message requesting modification of the first session to transfer the first portion of the plurality of stream endpoints from the mobile node to at least one third node while a second portion of the plurality of stream endpoints remains attached to the mobile node.

10. The method of claim 9, wherein receiving the first message comprises receiving at least one of control information, addresses of the corresponding, mobile, and third nodes, an identifier of the first session, and a proposed mapping of the plurality of streams.

11. The method of claim 10, wherein the first portion of the plurality of streams includes at least one audio stream and the second portion of the plurality of streams includes at least one video stream, and wherein receiving the first message comprises receiving a first message requesting transfer of at least one endpoint of either the audio stream or the video stream.

12. The method of claim 9, comprising providing a response message in response to providing the first message.

13. The method of claim 12, wherein providing the response message comprises providing the response message in response to user input.

14. The method of claim 13, wherein providing the response message comprises providing a response message accepting the requested transfer in response to user input.

15. The method of claim 13, wherein providing the response message comprises providing a response message declining the requested transfer in response to user input.

16. The method of claim 9, comprising modifying the first session by transferring the first portion of the plurality of stream endpoints from the mobile node to said at least one third node while a second portion of the plurality of stream endpoints remains attached to the mobile node.

\* \* \* \* \*